United States Patent
Asozu et al.

(10) Patent No.: US 10,012,858 B2
(45) Date of Patent: Jul. 3, 2018

(54) LIQUID CRYSTAL DISPLAY DEVICE

(71) Applicant: Japan Display Inc., Minato-ku (JP)

(72) Inventors: Genki Asozu, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/157,702

(22) Filed: May 18, 2016

(65) Prior Publication Data

US 2016/0363822 A1    Dec. 15, 2016

(30) Foreign Application Priority Data

Jun. 15, 2015 (JP) .................................. 2015-120273

(51) Int. Cl.
*G02F 1/1343* (2006.01)
*G02F 1/1333* (2006.01)
*G02F 1/1337* (2006.01)
*G02F 1/1362* (2006.01)

(52) U.S. Cl.
CPC .... *G02F 1/133371* (2013.01); *G02F 1/13624* (2013.01); *G02F 1/133345* (2013.01); *G02F 1/133707* (2013.01); *G02F 2001/133337* (2013.01); *G02F 2001/134345* (2013.01)

(58) Field of Classification Search
CPC ............. G02F 1/134309; G02F 1/1337; G02F 1/133707; G02F 1/1368; G02F 1/133345; G02F 1/13306; G02F 1/133512; G02F 1/13624; G02F 2001/133337; G02F 2001/134345
See application file for complete search history.

(56) References Cited

U.S. PATENT DOCUMENTS

| | | | |
|---|---|---|---|
| 2005/0275610 A1* | 12/2005 | Roh ..................... | G09G 3/3614 345/88 |
| 2006/0139541 A1* | 6/2006 | Yamaguchi ....... | G02F 1/133707 349/130 |
| 2014/0132867 A1* | 5/2014 | Cho ...................... | G02F 1/1368 349/42 |
| 2015/0070633 A1* | 3/2015 | Miyazaki .......... | G02F 1/133528 349/96 |

FOREIGN PATENT DOCUMENTS

JP       2010-79150      4/2010

* cited by examiner

*Primary Examiner* — Donald Raleigh
(74) *Attorney, Agent, or Firm* — Oblon, McClelland, Maier & Neustadt, L.L.P.

(57) ABSTRACT

According to one embodiment, a liquid crystal display device includes a first substrate, a second substrate and a liquid crystal layer. The first substrate includes a first sub-pixel, a second sub-pixel, a first line and a second line extending between the first sub-pixel and the second sub-pixel with a gap therebetween, and a first alignment film as an outermost layer. The second substrate includes a second alignment film opposed to the first alignment film. Further, the first substrate includes a groove in which the first alignment has a recessed surface between the first line and the second line, and the groove is filled with the liquid crystal layer.

13 Claims, 8 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2015-120273, filed Jun. 15, 2015, the entire contents of which are incorporated herein by reference.

FIELD

Embodiments described herein relate generally to a liquid crystal display device.

BACKGROUND

In general, a liquid crystal display device comprises an array substrate including a switching element and a pixel electrode, a counter-substrate opposed to the array substrate, and a liquid crystal layer interposed between the array substrate and the counter-substrate.

In the liquid crystal layer of the liquid crystal display device, there are ions induced by elements provided in the array substrate and the counter-substrate or by impurities entering from portions attached to the array substrate and the counter-substrate. These ions move through the liquid crystal layer, for example, as the liquid crystal display device is driven.

If the ions are concentrated into a certain portion in the liquid crystal layer, the effective voltage applied to the liquid crystal layer will decrease in this portion. As the effect voltage decreases in this portion, the luminance of the portion decreases accordingly, and this will have an effect such as a black spot on a display image.

DETAILED DESCRIPTION

In general, according to one embodiment, a liquid crystal display device comprises a first substrate, a second substrate and a liquid crystal layer. The first substrate includes a first sub-pixel, a second sub-pixel, a first line and a second line extending between the first sub-pixel and the second sub-pixel with a gap therebetween, and a first alignment film as an outermost layer. The second substrate comprises a second alignment film opposed to the first alignment film. The liquid crystal layer is held between the first alignment film and the second alignment film. Further, the first substrate comprises a groove in which the first alignment has a recessed surface between the first line and the second line, and the groove is filled with the liquid crystal layer.

An embodiment will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. In the drawings, reference numbers of continuously-arranged elements equivalent or similar to each other are omitted in some cases. Besides, in the specification and drawings, structural elements which function in the same or a similar manner as/to those described in connection with preceding drawings are denoted by like reference numerals, and a detailed description thereof is omitted unless otherwise necessary.

In the embodiment, a transmissive liquid crystal display will be described as an example of the liquid crystal display device. This liquid crystal display device can be used in various devices such as smartphones, tablet computers, feature phones, notebook computers, television receivers, in-car devices and game consoles. Note that the general structure of the embodiment is also applicable to a reflective liquid crystal display device, a transreflective liquid crystal display device having the function of a transmissive crystal display device as well as the function of a reflective crystal display device, and the like.

Figure 1:
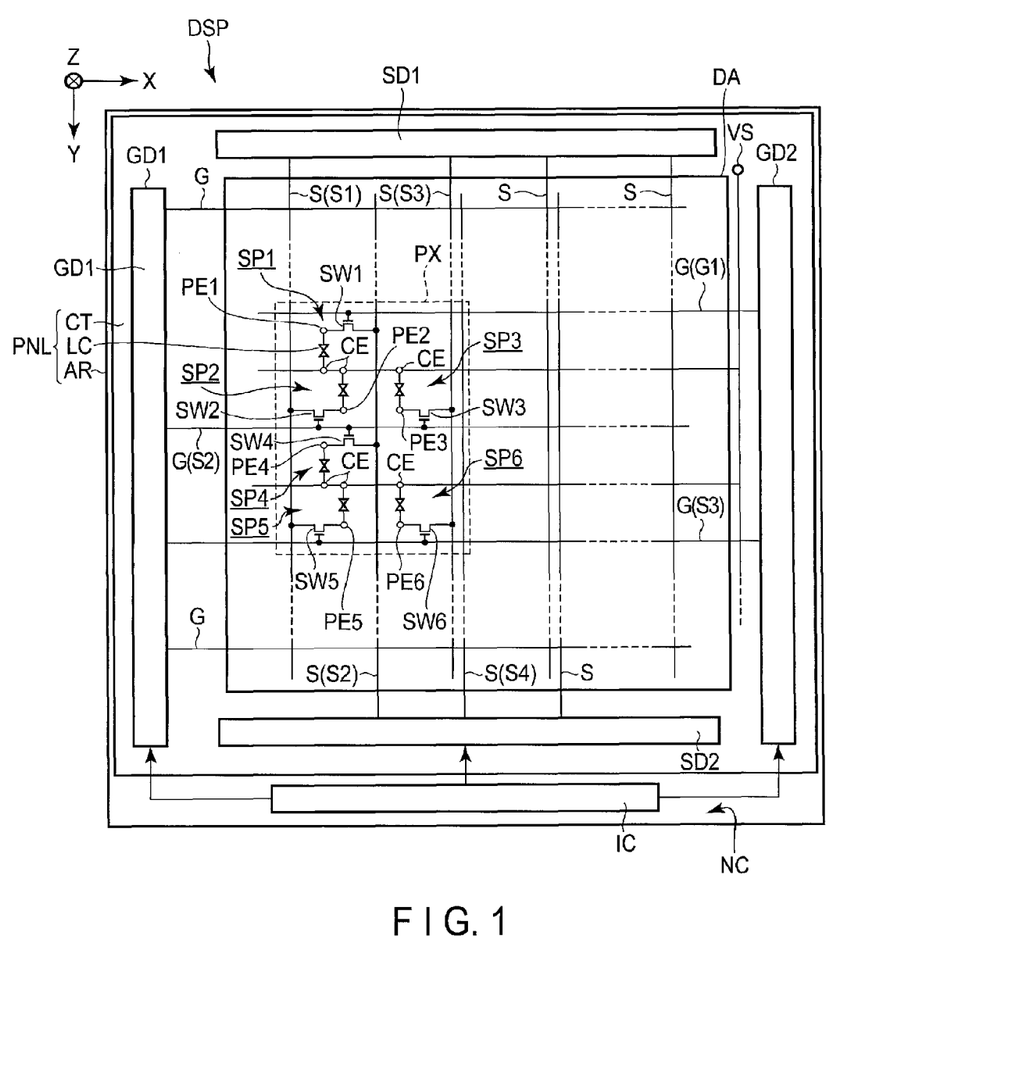
FIG. 1 is a schematic diagram showing the structure of a liquid crystal display device of an embodiment.

FIG. 1 is a schematic diagram showing the structure of a liquid crystal display device DSP of the present embodiment. The liquid crystal display device DSP comprises an active-matrix transmissive liquid display panel PNL. The liquid display panel PNL comprises a first substrate, namely, an array substrate AR, a second substrate opposed to the array substrate AR, namely, a counter-substrate CT, and a liquid crystal layer LC held between the array substrate AR and the counter-substrate CT.

The array substrate AR and the counter-substrate CT are, for example, rectangular plates. In the example of FIG. 1, the array substrate AR and the counter-substrate CT are rectangles having short sides along a first direction X and long sides along a second direction Y, which is perpendicular to the first direction X, and overlap with each other along a third direction Z, which is perpendicular to the first direction X and the second direction Y.

The liquid crystal display panel PNL comprises a display area DA, and the display area DA comprises a matrix of a plurality of main pixels PX arranged along the first direction X and the second direction Y.

The array substrate AR comprises a plurality of scan lines G extending along the first direction X and arranged along the second direction Y at substantially regular intervals, and a plurality of signal lines S extending along the second direction Y and arranged along the first direction X. Note that the scan line G and the signal line S are not necessarily straight lines but may be curved or winding lines. The scan line G and the signal line S are examples of interconnects formed in the array substrate AR. The scan line G may also be referred to as a gate line. Further, the signal line S may also be referred to as a source line.

In the example of FIG. 1, the liquid crystal display panel PNL comprises two scan line drivers GD1 and GD2, and two signal line drivers SD1 and SD2. The scan line drivers GD1 and GD2 and the signal line drivers SD1 and SD2 are formed, for example, in the array substrate AR. For example, counting from one end of the scan lines G, odd-numbered scan lines G are connected to the scan line driver GD1 and even-numbered scan lines G are connected to the scan line driver GD2. Further, for example, counting from one end of the signal lines S, odd-numbered signal lines S are connected to the signal line driver SD1 and even-numbered signal lines S are connected to the signal line driver SD2. Note that the liquid crystal display panel PNL may comprise only a single scan line driver and all the scan lines G may be connected to this scan line driver. Similarly, the liquid crystal display panel PNL may comprise only a single signal line driver and all the signal lines may be connected to this signal line driver.

The scan line drivers GD1 and GD2 and the signal line drivers SD1 and SD2 are connected to a display circuit module IC configured to control these drivers. In the example of FIG. 1, the array substrate AR is larger than the counter-substrate CT in the x-y plane and thus includes a portion not opposed to the counter-substrate CT, namely, a non-opposing area NC, and the display circuit module IC is provided in the non-opposing area NC. An external connection terminal and the like are also provided in the non-opposing area NC. Note that the display circuit module IC may also be provided in a flexible circuit board connected to the external connection terminal, a control board of the electronic device comprising the liquid crystal display device DSP, or the like.

FIG. 1 is a schematic diagram showing the equivalent circuit of a main pixel PX in the display area DA. The main pixel PX comprises six sub-pixels SP1 to SP6. The sub-pixels SP1 to SP6 correspond to different colors such as red, green, blue and white. Some of the sub-pixels SP1 to SP6 may correspond to the same colors.

The sub-pixels SP1 to SP6 shown in the drawing correspond to the areas defined by three scan lines G (G1 to G3) arranged in succession along the second direction Y and three signal lines S (S1 to S3) arranged in succession along the first direction X. That is, the sub-pixel SP1 corresponds to about a half of the area defined by the scan lines G1 and G2 and the signal lines S1 and S2, the sub-pixel SP2 corresponds to about the other half thereof, the sub-pixel SP3 corresponds to the area defined by the scan lines G1 and G2 and the signal lines S2 and S3, the sub-pixel SP4 corresponds to about a half of the area defined by the scan lines G2 and G3 and the signal lines S1 and S2, the sub-pixel SP5 corresponds to about the other half thereof, and the sub-pixel SP6 corresponds to the area defined by the scan lines G2 and G3 and the signal lines S2 and S3.

The sub-pixel SP1 comprises a switching element SW1 electrically connected to the scan line G1 and the signal line S2, and a pixel electrode PE1 electrically connected to the switching element SW1. The sub-pixel SP2 comprises a switching element SW2 electrically connected to the scan line G2 and the signal line S1, and a pixel electrode PE2 electrically connected to the switching element SW2. The sub-pixel SP3 comprises a switching element SW3 electrically connected to the scan line G2 and the signal line S3, and a pixel electrode PE3 electrically connected to the switching element SW3. The sub-pixel SP4 comprises a switching element SW4 electrically connected to the scan line G2 and the signal line S2, and a pixel electrode PE4 electrically connected to the switching element SW4. The sub-pixel SP5 comprises a switching element SW5 electrically connected to the scan line G3 and the signal line S1, and a pixel electrode PE5 electrically connected to the switching element SW5. The sub-pixel SP6 comprises a switching element SW6 electrically connected to the scan line G3 and the signal line S3, and a pixel electrode PE6 electrically connected to the switching element SW6. Note that the connection relationships of the switching elements SW (SW1 to SW6) of the respective sub-pixels to the scan lines G and the signal lines S are not necessarily limited to those of FIG. 1. The switching element SW is configured to switch electric characteristics such as resistance and is typically a thin-film transistor such as a field-effect transistor.

For example, the respective pixel electrodes PE (PE1 to PE6) are opposed to the common electrode CE. For example, the common electrode is provided across a plurality of the main pixels PX and is electrically connected to a voltage source VS which applies a common voltage.

The scan line drivers GD1 and GD2 sequentially output scanning signals to the respective scan lines G. The signal line drivers SD1 and SD2 selectively output image signals to the respective signal lines S. When the scanning signal and the image signal are input to a switching element SW, an electric field is produced between the pixel electrode PE connected to the switching element SW and the common electrode CE, and the alignment of the liquid crystal molecules of the liquid crystal layer LC held between the array substrate AR and the counter-substrate CT are changed by the electric field. In this way, it is possible, by selectively driving the sub-pixels SP of the main pixel PX, to display a color image on the display area DA with light transmitted from a backlight or the like through the liquid display panel PNL.

Between two adjacent main pixels PX arranged along the first direction X, for example, as in the case of the two signal lines S3 and S4 of FIG. 1, two signal lines S are arranged side by side with no intervening sub-pixel SP. The gap between these two signal lines S is less than the gap between two signal lines S arranged side by side with an intervening sub-pixel SP.

When the liquid crystal display device DSP is driven, a voltage is applied to each signal line S to create a potential difference between adjacent signal lines S. For example, supposing that the signal line driver D1 applies a first voltage to each signal line connected thereto and the signal line driver D2 applies a second voltage to each signal line connected thereto, the first voltage and the second voltage are different from each other.

For example, the first voltage and the second voltage have polarities different from each other. Further, the polarity of the first voltage and the polarity of the second voltage are inverted every frame of images displayed on the display area DA. More specifically, the first voltage is −5V and the second voltage is +5V in the first frame, and the first voltage is +5V and the second voltage is −5V in the second frame subsequent to the first frame.

Figure 2:
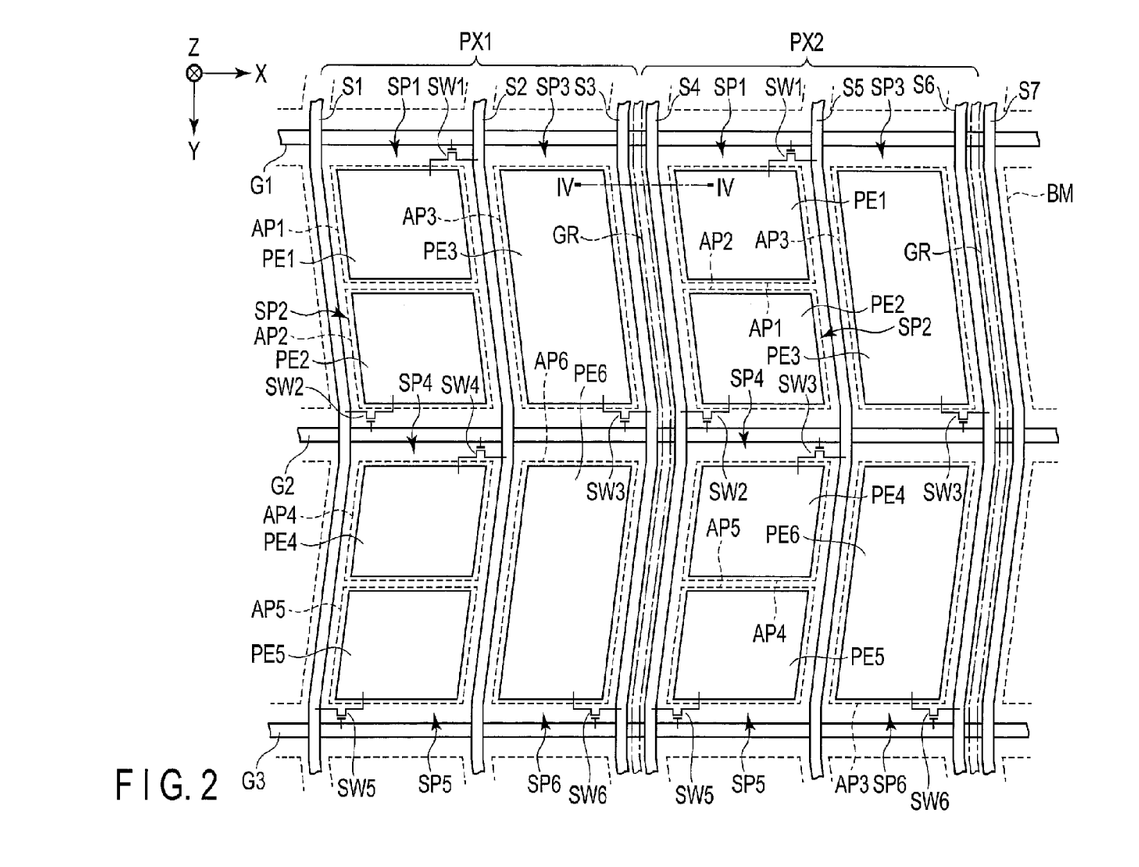
FIG. 2 is a schematic diagram showing one example of the layout of a main pixel of the embodiment.

FIG. 2 is a schematic diagram showing one example of the layout of the main pixel PX. Here, the drawing partly shows the structural elements of two main pixels PX (P×1 and PX2) arranged along the first direction X and some other peripheral structural elements.

In the example of FIG. 2, three scan lines G1 to G3 and seven signal lines S1 to S7 are illustrated, but the scan lines G1 to G3 extend linearly along the first direction X, while the seven signal lines S1 to S7 extend windingly along the second direction Y.

The connection relationships of the sub-pixels SP1 to SP6 of the main pixel PX1 to the scan lines G1 to G3 and the signal lines S1 to S3 and the connection relationships of the switching elements SW1 to SW6 of the main pixel PX1 to the scan lines G1 to G3 and the signal lines S1 to S3 are the same as those of the main pixel PX of FIG. 1. Further, the connection relationships of the sub-pixels SP1 to SP6 of the main pixel PX2 to the scan lines G1 to G3 and the signal lines S4 to S6 are the same as the connection relationships of the sub-pixels SP1 to SP6 of the main pixel PX1 to the scan lines G1 to G3 and the signal lines S1 to S3. The signal lines S6 and S7 are arranged side by side with no intervening sub-pixel SP in a manner similar to that of the signal lines S3 and S4.

In the layout of FIG. 2, turning to the first to third sub-pixels arranged on both sides of the two signal lines S (first line and second line) arranged side by side with no intervening sub-pixels SP, the first sub-pixel and the second sub-pixel as well as the first sub-pixel and the third sub-pixel are arranged along the first direction X, while the second sub-pixel and the third sub-pixel are arranged along the second direction Y. Further, the two signal lines S and a groove GR extend between the first sub-pixel and the second sub-pixel and between the first sub-pixel and the third sub-pixel. For example, supposing that the first line and the second line are the signal lines S3 and S4, the first sub-pixel corresponds to the sub-pixel SP3 of the main pixel PX1, the second sub-pixel corresponds to the sub-pixel SP1 of the main pixel PX2, and the third sub-pixel corresponds to the sub-pixel SP2 of the main pixel PX2. In another example, the first sub-pixel may correspond to the sub-pixel SP6 of the main pixel PX1, the second sub-pixel may correspond to the sub-pixel SP4 of the main pixel PX2, and the third sub-pixel may correspond to the sub-pixel SP5 of the main pixel PX2.

The scan lines G1 to G3, the signal lines S1 to S7, and the switching elements SW1 to SW6 of the main pixels PX1 and PX2 overlap with a light-shielding layer BM (the shapes of the edges are shown by broken lines) provided in the counter-substrate CT in the x-y plane. The light-shielding layer BM also extends at the boundary of the sub-pixels SP1 and SP2 and the boundary of the sub-pixels SP4 and SP5. The light-shielding layer BM forms aperture areas AP1 to AP6 corresponding to the sub-pixels SP1 to SP6. For example, the sizes of the aperture areas AP1, AP2, AP4 and AP5 are substantially the same as each other. Further, the sizes of Lhe aperture areas AP3 and AP6 have substantially the same as each other and are about twice as large as the sizes of the aperture areas AP1, AP2, AP4 and AP5.

The pixel electrodes PE1 to PE6 are arranged respectively in the aperture areas AP1 to AP6. In the case of adopting the In-plane Switching (IPS) mode in which the pixel electrodes PE1 to PE6 and the common electrode CE are provided in the array substrate AR, or more specifically, the fringe field switching (FFS) mode of the IPS mode in which the pixel electrodes PE1 to PE6 and the common electrode CE are opposed to each other via an insulating layer as the mode of the liquid crystal display panel PNL, one or more slits are made in each of the pixel electrodes PE1 to PE6 or in the common electrode CE.

For example, in the main pixel PX1, the sub-pixels SP1 and SP4 correspond to green, the sub-pixels SP2 and SP5 correspond to red, the sub-pixel SP3 corresponds to blue, and the sub-pixel SP6 corresponds to white. On the other hand, in the main pixel PX2, the sub-pixels SP1 and SP4 correspond to green, the sub-pixels SP2 and SP5 correspond to red, the sub-pixel SP3 corresponds to white, and the sub-pixel SP6 corresponds to blue. Note that the above-described correspondence relationships of the sub-pixels SP1 to SP6 to the colors are in no way restrictive. The main pixels PX1 and PX2 are arranged in succession along the second direction Y. In the mean time, the main pixels PX1 and PX2 are arranged alternately along the first direction X.

The groove GR is formed in the array substrate AR on the side of the liquid crystal layer LC. The groove GR is formed between two signal lines arranged side by side with no intervening sub-pixel SP such as the signal lines S3 and S4 and the signal lines S6 and S7. In the example of FIG. 2, the groove GR crosses the scan lines G1 to G3. Note that the groove GR may extend intermittently to avoid crossing the scan lines instead. In that case, the groove GR may be formed in each area encircled with two adjacent scan lines G and two adjacent signal lines arranged side by side with no intervening sub-pixel SP. Alternatively, the groove GR may be further broken into several lines between two adjacent scan lines G or may also be formed in various other manners.

Figure 3:
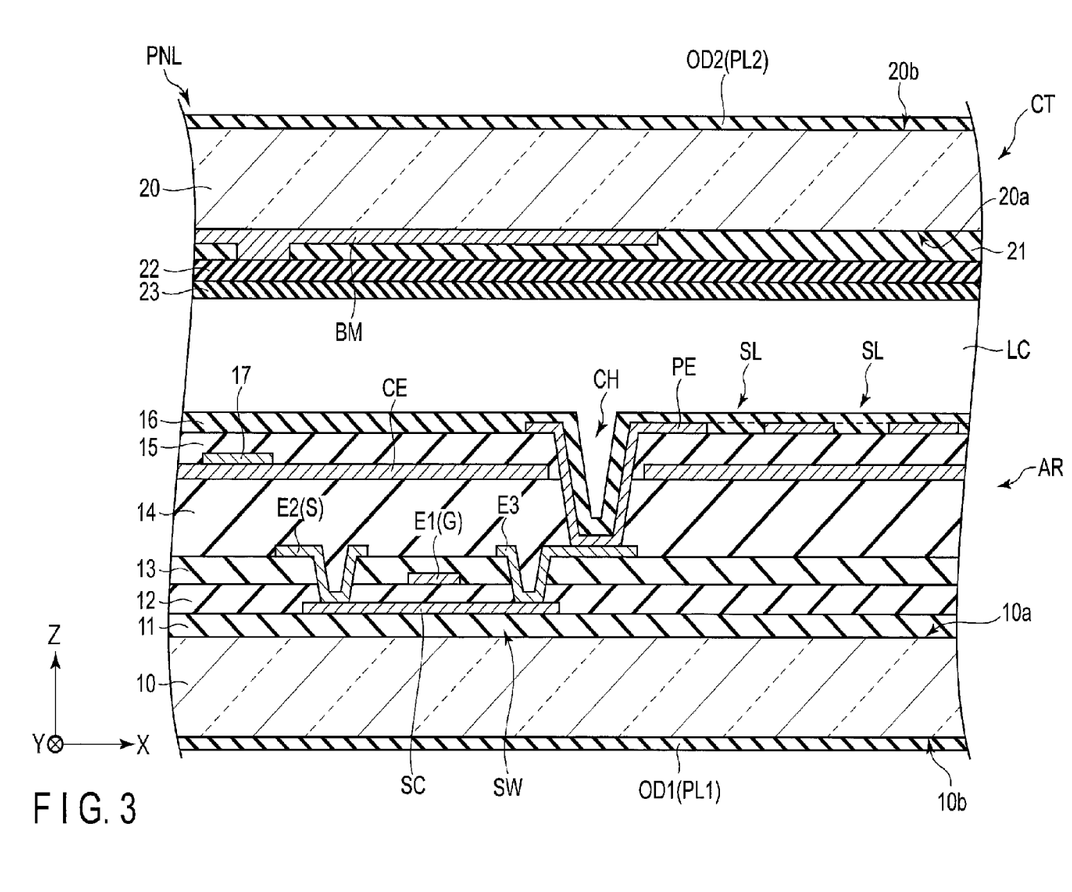
FIG. 3 is a schematic diagram showing one example of the section of a liquid crystal display panel of the embodiment.

FIG. 3 is a schematic diagram showing an example of the section of the liquid crystal display panel PNL. Here, although the drawing mainly shows the structure of a single sub-pixel SP, all the sub-pixels SP1 to SP6 have this structure in common.

The array substrate AR further comprises, in addition to the above-described switching element SW and the pixel electrode PE, a first insulating substrate 10, an undercoat layer 11, a first insulating layer 12, a second insulating layer 13, a third insulating layer 14, a fourth insulating layer 15, and a first alignment film 16. Further, the structure of FIG. 3 is a structure applicable to the FFS mode, and thus the array substrate AR further comprises the common electrode CE. The switching element SW comprises a semiconductor layer SC, a first electrode E1, a second electrode E2 and a third electrode E3. In this example, the first electrode E1, the second electrode E2 and the third electrode E3 may also be referred to as a gate electrode, a source electrode and a drain electrode (or a junction electrode), respectively.

The first insulating substrate 10 is, for example, a glass substrate or a resin substrate, and comprises a first main surface 10a and a second main surface 10b opposite to the first main surface 10a. The undercoat layer 11 covers the first main surface 10a of the first insulating substrate 10.

The semiconductor layer SC is formed of, for example, a polysilicon material and is disposed on the undercoat layer 11. The semiconductor layer SC and the undercoat layer 11 are covered with the first insulating layer 12. The first electrode E1 is disposed on the first insulating layer 12. The scan line G is also disposed on the first insulating layer 12. In this example, the first electrode E1 is a part of the scan line G. The first electrode E1 (scan line G) and the first insulating layer 12 are covered with the second insulating layer 13.

The second electrode E2 and the third electrode E3 are disposed on the insulating layer 13. The signal line S is also disposed on the second insulating layer 13. In this example, the second electrode E2 is a part of the signal line S. The second electrode E2 and the third electrode E3 are in contact with the semiconductor layer SC. The switching element SW having the above-described structure is a single-top-gate thin-film transistor. Note that the switching element SW may also be a switching element of various other types such as a double-gate thin-film transistor or a bottom-gate thin-film transistor.

The second electrode E2 (signal line S), the third electrode E3 and the second insulating layer 13 are covered with the third insulating layer 14 formed of, for example, an organic resin material. The third insulating layer 14 is interposed between the switching element SW and the common electrode CE and between the switching element SW and the pixel electrode PE, and serves as an organic planarization film to smooth unevenness resulting from the switching element SW.

The common electrode CE is disposed on the third insulating layer 14. The common electrode CE is formed of, for example, a transparent, conductive material such as indium tin oxide (ITO). In the example of FIG. 3, a metal line 17 is disposed on the common electrode CE. The metal line 17 has the function of reducing the resistance of the common electrode CE of ITO or the like. In the case of the liquid crystal display device DSP with the sensing function of detecting an object in contact with or in proximity to the display area DA, the common electrode CE may serve as one of electrodes used for object detection. In that case, the metal line 17 can improve the detection performance.

The common electrode CE and the metal line 17 are covered with the fourth insulating layer 15. The pixel electrode PE is formed on the fourth insulating film 15. The fourth insulating layer 15 serves as an interlayer insulating film between the common electrode CE and the pixel electrode PE. The pixel electrode PE is electrically connected to the third electrode E3 via a contact hole CH penetrating the third insulating layer 14 and the fourth insulating layer 15. The common electrode CE is open in a portion corresponding to the contact hole CH. In the example of FIG. 3, the pixel electrode PE comprises a plurality of slits.

The pixel electrode PE and the fourth insulating layer 15 are covered with the first alignment film 16. The first alignment film 16 is provided with an alignment function by a photoalignment method or a rubbing alignment method and is the outermost layer of the array substrate AR on the side of the counter-substrate CT.

On the other hand, the counter-substrate CT comprises a second insulating substrate 20, a color filter layer 21, an overcoat layer 22, a second alignment film 23, and the above-described light-shielding layer BM. The second insulating substrate 20 is, for example, a glass substrate or a resin substrate, and comprises a first main surface 20a and a second main surface 20b opposite to the first main surface 20a. The first main surface 20a is covered with the color filter layer 21 and the light-shielding layer BM. The color filter layer 21 includes a plurality of color filters corresponding respectively to the sub-pixels SP1 to SP6. The color filters are colored in accordance with the colors of the sub-pixels SP. Further, a transparent color filter is provided for a white sub-pixel in this example, but it is also possible not to provide any color filter at all for a white sub-pixel.

The overcoat layer 22 covers the color filter layer 21 and smoothes unevenness developed at the boundaries of the color filters. The overcoat layer 22 is covered with the second alignment film 23. The second alignment film 23 is provided with an alignment function by a photoalignment method or a rubbing alignment method and is the outermost layer of the counter-substrate CT on the side of the array substrate AR.

The array substrate AR and the counter-substrate CT are attached to each other with a seal member provided along the edges and hold the liquid crystal layer LC containing liquid crystal molecules between the first alignment film 16 and the second alignment film 23.

A first optical device OD1 including a first polarizer PL1 is disposed on the second main surface 10b of the first insulating substrate 10, and a second optical device OD2 including a second polarizer PL2 is disposed on the second main surface 20b of the second insulating substrate 20. A first polarization axis (or a first absorption axis) of the first polarizer PL1 and a second polarization axis (or a second absorption axis) of the second polarizer PL2 are, for example, orthogonal to each other as in a crossed-Nicol relationship.

Figure 4:
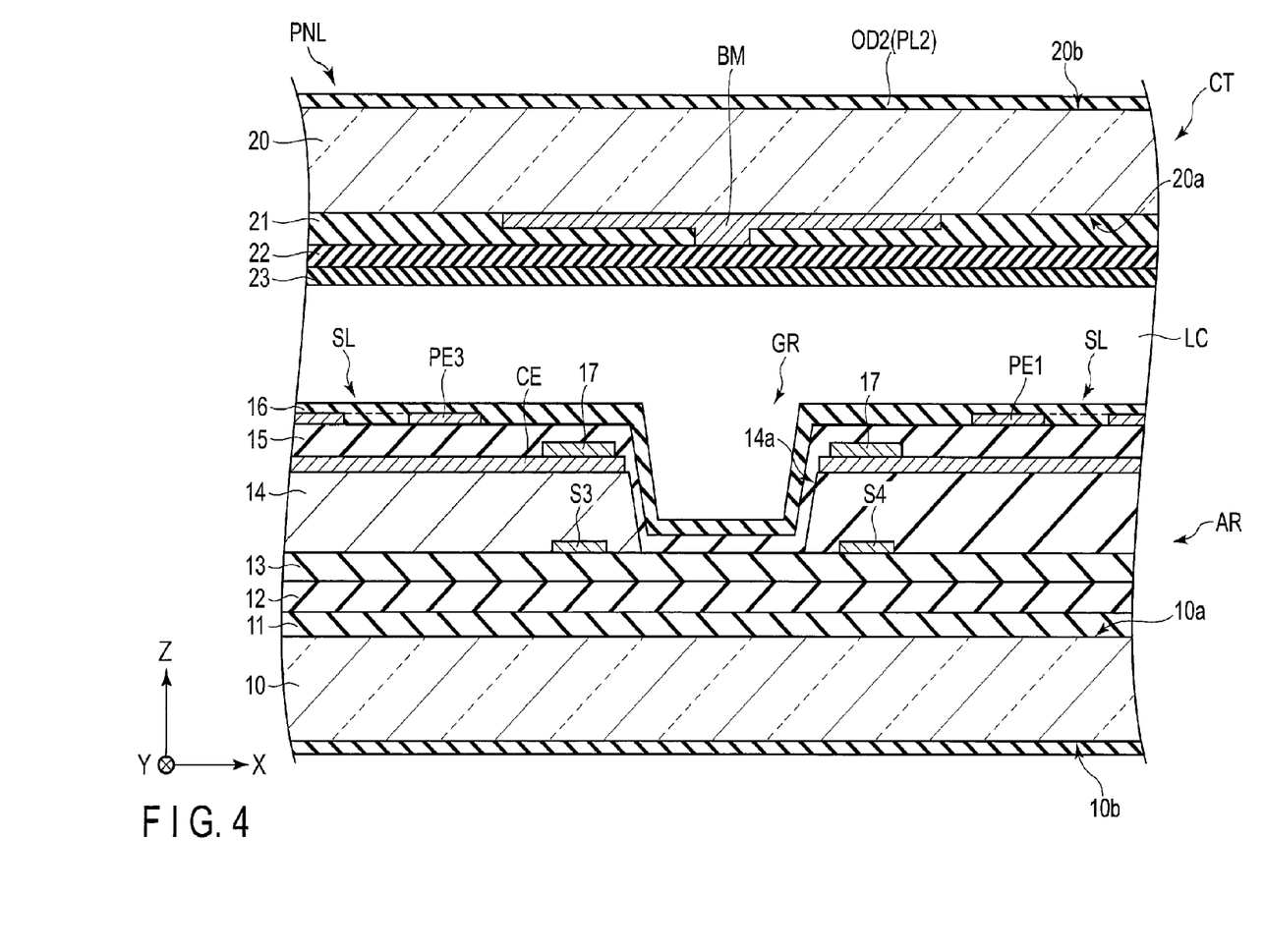
FIG. 4 is a schematic diagram showing one example of the section of the liquid crystal display panel taken along line IV-IV of FIG. 2.

FIG. 4 is a schematic diagram showing one example of the section of the liquid crystal display panel PNL taken along line IV-IV of FIG. 2. Here, the section diagram corresponds to a sectional view from the sub-pixel SP3 of the main pixel PX1 to the sub-pixel SP1 of the main pixel PX2 and shows the pixel electrode PE3 of the sub-pixel SP3, the pixel electrode PE1 of the sub-pixel SP1, the signal lines S3 and S4, the groove GR formed between the signal lines S3 and S4, and the like The third insulating layer 14 comprises an opening portion 14a between the signal lines S3 and S4. The opening portion 14a penetrates the third insulating layer 14 and extends along the signal lines S3 and S4 in the longitudinal direction in a manner similar to that of the groove GR of FIG. 2.

The fourth insulating layer 15 and the first alignment film 16 are recessed in the opening portion 14a toward the first insulating substrate 10, and the groove GR is thereby formed. The groove GR penetrates the common electrode CE. The groove GR is filled with the liquid crystal layer LC. The light shielding layer BM extends continuously to be opposed to the signal lines S3 and S4 and the groove GR.

Note that, in another example, it is also possible, by not completely but partly removing the third insulating layer 14 in a position corresponding to the opening 14a of FIG. 4, to form the recess portion while leaving the third insulating layer 14 having a certain thickness in the third direction Z. In this case also, the fourth insulating layer 15 and the first alignment film 16 are recessed in the recessed portion, and thus the groove GR can be formed.

In this example, the thickness of the third insulating layer 14 is about 3 μm, and the gap between the signal lines S3 and S4 is 2 to 3 μm. In this case, the groove GR having a height of 3 μm or less and a width of 2 to 3 μm or less is formed. That is, the height of the groove GR is less than or equal to the thickness of the third insulating layer 14. From another point of view, the height of the groove GR is greater than the gap of the signal lines S3 and S4. Further, the width of the groove GR is less than the thickness of the third insulating layer 14.

Here, a possible problem with a conventional liquid crystal display device will be described with reference to FIGS. 5A to 5C. The drawings show a liquid crystal display device DSPa as a comparative example of the present embodiment, a position of a seal member SM attaching an array substrate and a counter-substrate of the liquid crystal display device DSPa to each other, and a display area DAa. There is a non-display area NDAa between the seal member SM and the display area DAa, which does not serve for display but includes a liquid crystal layer.

Figure 5A:
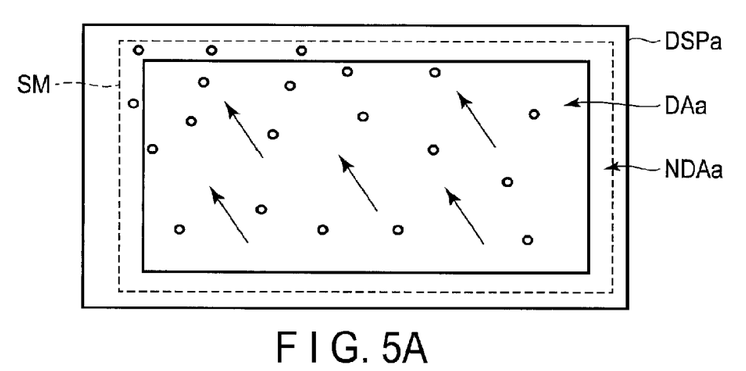
FIG. 5A is an explanatory diagram showing a possible problem with a conventional liquid crystal display device.
Figure 5B:
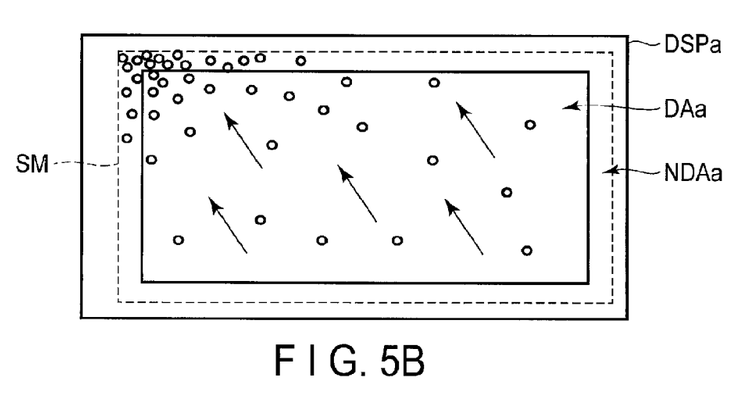
FIG. 5B is another explanatory diagram showing the problem with the conventional liquid crystal display device.

As represented schematically as small circles in FIG. 5A, there is a number of ions in the liquid crystal layer. These ions are, for example, positive ions inducted by impurities or the like entering the liquid crystal layer, for example, from openings near the seal member SM or via alignment films. These ions move in a predetermined direction as shown by the arrows in FIG. 5A, for example, in response to an electric field produced by interconnects provided outside the display area DAa. The ions moving in the predetermined direction accumulate in the non-display area NDAa as shown in FIG. 5B. As long as the ions remain within the non-display area NDAa, the ions have a limited effect on an image displayed on the display area DAa.

Figure 5C:
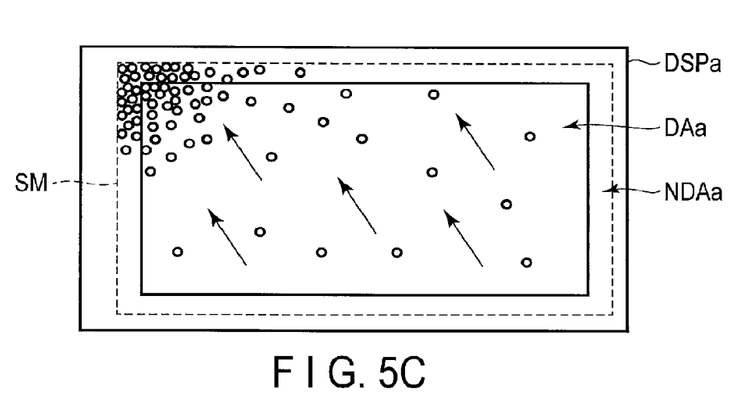
FIG. 5C is another explanatory diagram showing the problem with the conventional liquid crystal display.

Eventually, as shown in FIG. 5C, the ions overflow the non-display area NDAa onto the display area DAa. As the ions overflow onto the display area DAa, the effective voltage to be applied to the display area DAa of the liquid crystal display decreases, and this has an effect such as a black spot on an image displayed in the display area DAa.

Figure 6:
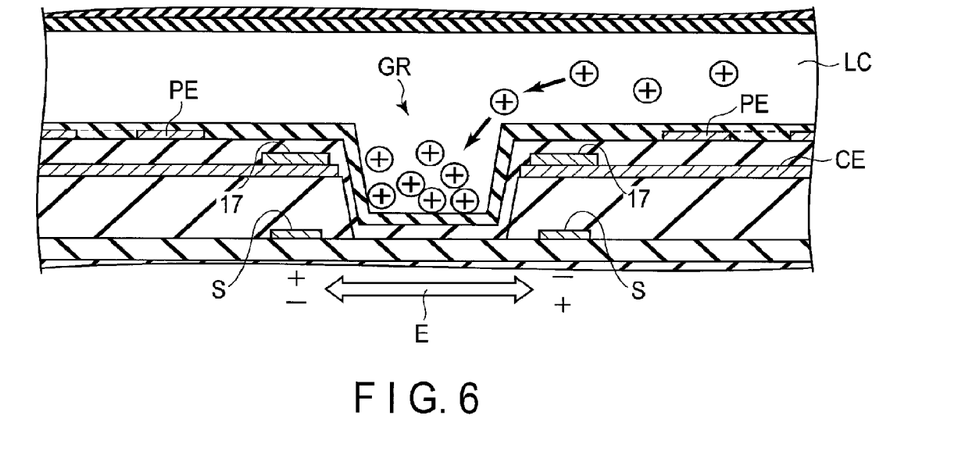
FIG. 6 is an explanatory diagram showing one technical effect achieved by the embodiment.

On the other hand, in the case of providing the groove GR as shown in FIGS. 2 and 4, it is possible to suppress or prevent any effect by the ions on a display image. FIG. 6 is an explanatory diagram showing the technical effect of the embodiment and schematically showing the section of the liquid crystal panel in the vicinity of the groove GR.

Each of the plurality of positive ions in the liquid crystal layer LC is represented schematically as a circle with a plus. When the liquid crystal display device DSP is driven, these ions move in a predetermined direction in response to the Coulomb force from the electric field or the like produced by interconnects provided outside the display area DA.

As described above, when the liquid crystal display device DSP is driven, a voltage is applied to each signal line S to create a potential difference between adjacent signal lines S. That is, there is a potential difference between the signal lines S arranged on the sides of the groove GR, and thus an electric field E (lateral electric field) containing components parallel to the x-y plane is produced between these signal lines S. As the polarity of the voltage applied to the signal line S is inverted on a frame of images basis, the direction of the electric field E is inverted on a frame of images basis accordingly.

Since the electric field E is working in the groove GR, some ions in the liquid crystal layer LC are drawn to the groove GR, and since the direction of the electric field E changes, these ions are stuck in the groove GR. The groove GR and the vicinity thereof are opposed to the light-shielding layer BM, and thus even if the ions accumulating in the groove GR cause a decrease in the voltage applied to the liquid crystal display LC, there is little effect on the display image.

Further, since the groove GR is provided throughout the display area DA, more specifically, between two signal lines arranged side by side with no intervening sub-pixel SP, it is possible to spread the ions over the display area DA effectively. Consequently, the ions will not accumulate in the groove GR to such an extent that the ions causes an effect such as a voltage decrease beyond the area opposed to the light-shielding layer BM.

Figure 7A:
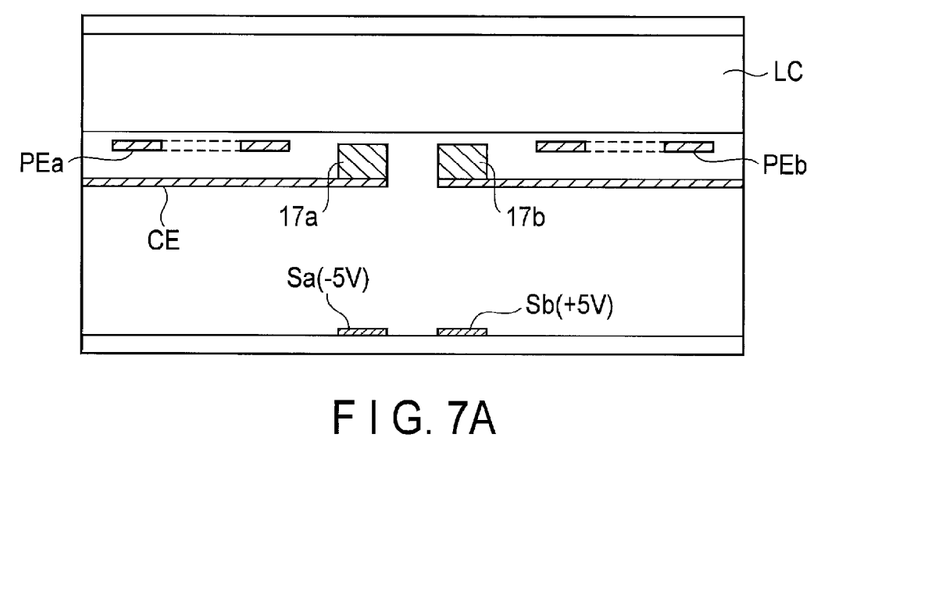
FIG. 7A is a diagram showing a simulation model in which an array substrate does not have a groove.
Figure 8A:
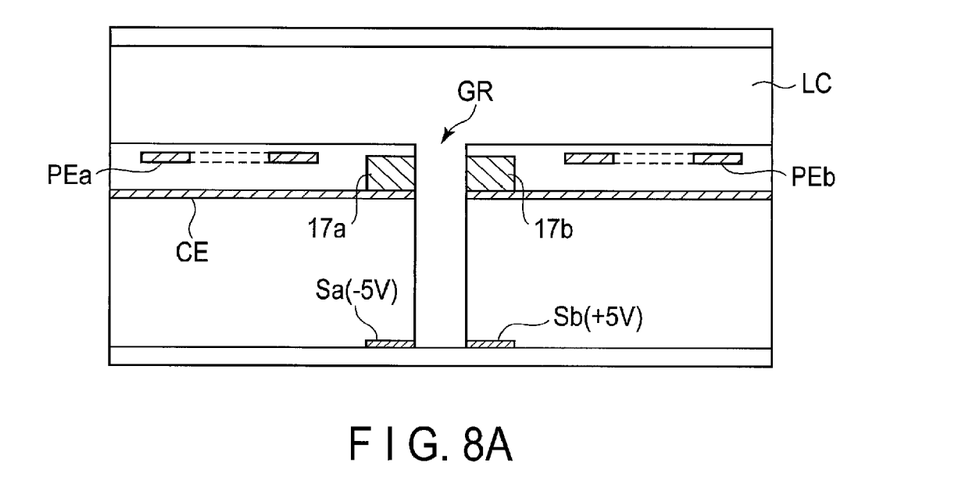
FIG. 8A is a diagram showing a simulation model in which an array substrate has a groove.

The inventor has examined possible effects of the groove GR on the electric field between the pixel electrode PE and the common electrode CE. FIGS. 7A and 8A show simulation models. The model of FIG. 7A comprises two pixel electrodes PEa and PEb including slits, a common electrode CE opposed to the pixel electrodes PEa and PEb, two metal lines 17a and 17b disposed on the common electrode CE, and two signal lines Sa and Sb. The common electrode CE is partly open, and the pixel electrode PEa, the metal line 17a, and the signal line Sa are disposed on one side of the opening portion, while the pixel electrode PEb, the metal line 17b, and the signal line Sb are disposed on the other side of the opening portion. The model of FIG. 8A is different from the model of FIG. 7A in that a groove GR is further formed between the signal lines Sa and Sb through the opening portion of the common electrode CE and that the liquid crystal layer LC extends in the groove GR.

Figure 7B:
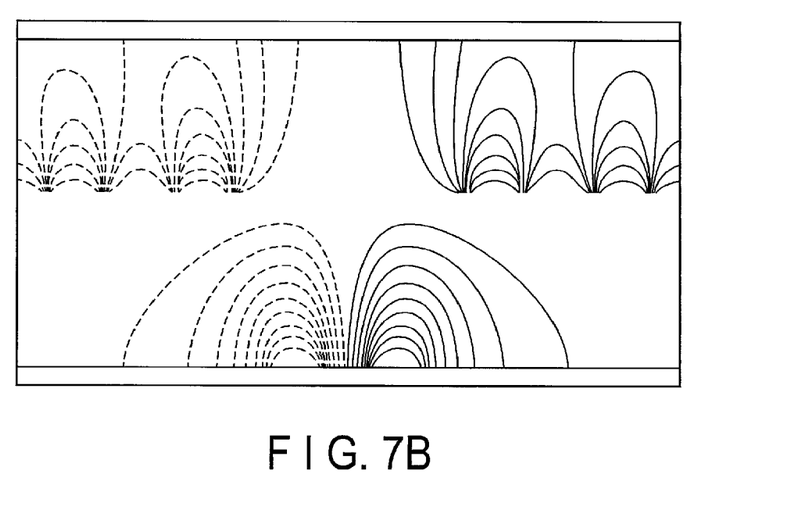
FIG. 7B is a diagram showing a result of simulation on the model of FIG. 7A.
Figure 8B:
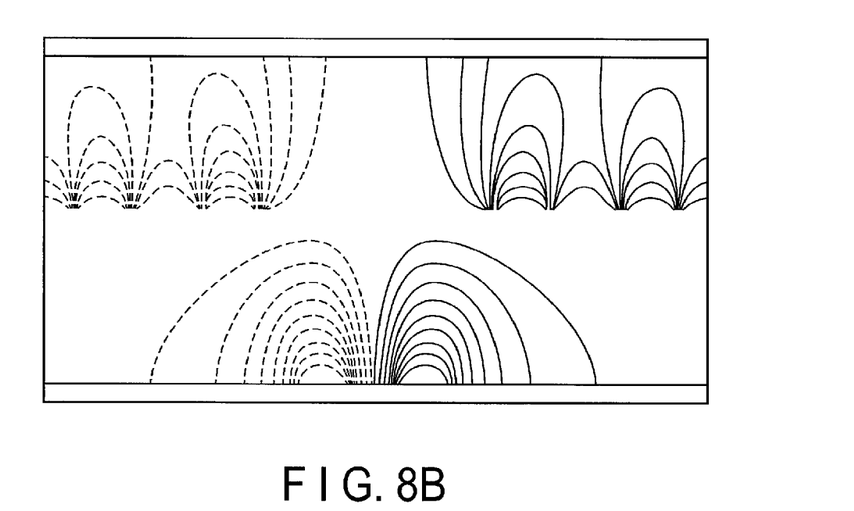
FIG. 8B is a diagram showing a result of simulation on the model of FIG. 8A.

In these models, an electric field is simulated under a condition in which a voltage of −5V is applied to the signal line Sa and a voltage of +5V is applied to the signal line Sb. The voltage of the common electrode is zero. The result for the model of FIG. 7A is shown in FIG. 7B, and the result for the model of FIG. 8A is shown in FIG. 8B. In the drawings, positive equipotential lines are shown as solid lines, and negative equipotential lines are shown as broken lines.

In both FIGS. 7B and 8B, a negative electric field was produced on the signal line Sa side between the signal lines Sa and Sb, while a positive electric field was produced on the signal line Sb side between the signal lines Sa and Sb, and the equipotential lines of the electric fields were substantially in the same shape as each other. Further, in both FIGS. 7B and 8B, a negative electric field was produced between the pixel electrode PEa and the common electrode CE connected to the signal line Sa, while a positive electric field was produced between the pixel electrode PEb and the common electrode CE connected to the signal line Sb, and the equipotential lines of the electric fields were substantially in the same shape as each other.

As is evident from the above simulations, even in the case of providing the groove GR, there is little effect on the electric fields produced between the pixel electrodes PEa and PEb and the common electrode CE, and thus the liquid crystal display device SP operates normally.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the layout of the sub-pixels SP is not necessarily restricted to the layout of the sub-pixels of different sizes such as that of the sub-pixels of FIGS. 1 and 2 in which the sub-pixels SP1, SP2, SP4 and SP5 are one size and the sub-pixels SP3 and SP6 are another size. For example, the main pixel PX may consist of sub-pixels of the same size. Further, the number of the sub-pixels constituting the main pixel PX in the above description is in no way restrictive, either.

Still further, the mode of the liquid crystal display device DSP is not necessarily the IPS mode and the like using the lateral electric field (including the fringe field). For example, it is also possible, by providing the common electrode CE in the counter-substrate CT, to adopt a mode using the vertical electric field produced between the common electrode CE and the pixel electrode PE of the array substrate.

What is claimed is:
1. A liquid crystal display device comprising:
   a first substrate including a first sub-pixel, a second sub-pixel, a first line and a second line extending between the first sub-pixel and the second sub-pixel with a gap therebetween, a first insulating layer covering the first line and the second line, a first alignment film as an outermost layer, and a common electrode on the first insulating layer to which is applied a common potential;

a second substrate including a second alignment film opposed to the first alignment film; and a liquid crystal layer held between the first alignment film and the second alignment film, wherein the first line and the second line are adjacent to each other with no sub-pixel interposed therebetween, the first substrate includes a groove in which the first alignment film over the common electrode has a recessed surface between the first line and the second line, the groove is filled with the liquid crystal layer, the groove is formed in the first insulating layer at least partly removed between the first line and the second line, and the groove penetrates the common electrode.

2. The liquid crystal display device of claim 1, wherein the first substrate further includes a third sub-pixel, the first sub-pixel and the second sub-pixel as well as the first sub-pixel and the third sub-pixel are arranged along a first direction, and the second sub-pixel and the third sub-pixel are arranged along a second direction crossing the first direction, the first line, the second line, and the groove extend between the first sub-pixel and the second sub-pixel and between the first sub-pixel and the third sub-pixel.

3. The liquid crystal display device of claim 1, wherein the first substrate further includes a first pixel electrode and a second pixel electrode disposed respectively in the first sub-pixel and the second sub-pixel, a first switching element and a second switching element electrically connected respectively to the first pixel electrode and the second pixel electrode, and the first insulating layer is disposed between the first and second pixel electrodes and the first and second switching elements.

4. The liquid crystal display device of Claim 1, wherein the height of the groove is less than or equal to the thickness of the first insulating layer.

5. The liquid crystal display device of Claim 1, wherein the width of the groove is less than the thickness of the first insulating layer.

6. The liquid crystal display device of Claim 1, wherein the height of the groove is greater than the gap between the first line and the second line.

7. The liquid crystal display device of claim 1, further comprising a driver configured to apply a first voltage to the first line and a second voltage different from the first voltage to the second line.

8. The liquid crystal display device of claim 7, wherein the first voltage and the second voltage have polarities different from each other.

9. The liquid crystal display device of claim 8, wherein the polarity of the first voltage and the polarity of the second voltage are inverted between a first frame and a second frame subsequent to the first frame.

10. The liquid crystal display device of claim 1, wherein the second substrate includes a light-shielding layer opposed to the first line, the second line and the groove.

11. The liquid crystal display device of claim 1, wherein the first substrate further includes a scan line crossing the first line and the second line, and the groove crosses the scan line.

12. The liquid crystal display device of claim 3, wherein the first substrate further includes a second insulating layer between the common electrode and the first and second pixel electrodes, and the second insulating layer is recessed along the groove.

13. The liquid crystal display device of claim 1, wherein the first substrate further includes a first metal layer and a second metal layer on the common electrode, and the groove is formed between the first metal layer and the second metal layer.

* * * * *